Dec. 8, 1970  J. E. KAUPPILA  3,546,493
VARIABLE CAPACITANCE DIRECT CURRENT REGULATOR CIRCUIT
Filed Sept. 20, 1968

INVENTOR.
James E. Kauppila
BY
Thomas N. Young
ATTORNEY

United States Patent Office 3,546,493
Patented Dec. 8, 1970

---

3,546,493
VARIABLE CAPACITANCE DIRECT CURRENT REGULATOR CIRCUIT
James E. Kauppila, Troy, Mich., assignor to General Motors Corporation, Detroit, Mich., a corporation of Delaware
Filed Sept. 20, 1968, Ser. No. 761,111
Int. Cl. H01l 1/14
U.S. Cl. 307—304   8 Claims

ABSTRACT OF THE DISCLOSURE

A direct current regulator circuit including a variable capacitance network and an insulated-gate transistor. The variable capacitance network controls the voltage applied to operate the insulated-gate transistor thereby regulating the flow of direct current through the insulated-gate transistor.

---

This invention relates to a direct current regulator circuit, and more particularly to a variable capacitance position sensor circuit.

Variable capacitance networks are readily adaptable to perform a wide variety of electrical control functions. Specifically, variable capacitance networks provide excellent position sensors for monitoring the relative position of a movable member. However, variable capacitance networks are incapable of producing a direct current output. Therefore, the application of variable capacitance networks within direct current electrical systems has been severely restricted due to the additional complex circuitry required to develop a direct current output.

Accordingly, it is an object of this invention to provide a circuit for developing a direct current output from a variable capacitance network without requiring additional complex circuitry. It is another object of this invention to provide a simple and reliable direct current regulator circuit incorporating a variable capacitance network. It is a further object of this invention to provide a variable capacitance position sensor circuit for producing a direct current output corresponding to the relative position of a movable member.

In order to achieve these and other objects, a preferred embodiment of the invention provides a variable capacitance potentiometer or voltage divider network and an insulated-gate transistor. The variable capacitance network develops a voltage which is applied to the gate electrode of the insulated-gate transistor so as to regulate the flow of direct current through the insulated-gate transistor.

The invention may be best understood by reference to the following detailed description of the preferred embodiments of the invention when considered in conjunction with the accompanying drawing, in which.

Figure 1:
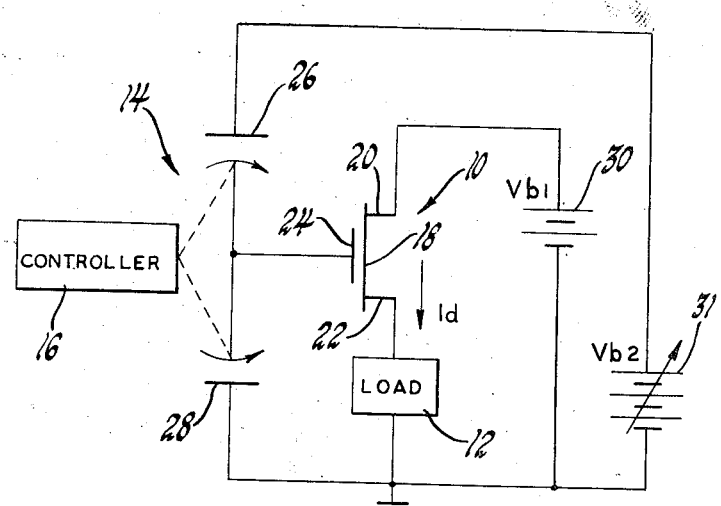
FIG. 1 is a schematic diagram of a direct current regulator circuit incorporating the principles of the invention.

Referring to the schematic diagram of FIG. 1, the illustrated embodiment of the inventive direct current regulator circuit includes an insulated-gate transistor 10, a load 12, a variable capacitance network 14, and a controller 16. The controller 16 regulates the capacitance of the variable capacitance network 14 so as to determine the control voltage applied to operate the insulated-gate transistor 10 thereby regulating the flow of direct current through the load 12.

The insulated-gate transistor 10 comprises a channel 18, a source electrode 20, a drain electrode 22, and a control or gate electrode 24. The channel 18 is connected to the source electrode 20 and the drain electrode 22 and is insulated from the electrode 24. The load 12 is connected in series with the insulated-gate transistor 10 between the drain electrode 22 and ground. The variable capacitance network 14 comprises a potentiometer or voltage divider including a pair of series coupled varaible capacitors 26 and 28. The gate electrode 24 of the insulated-gate transistor 10 is connected to the junction between the variable capacitors 26 and 28. The controller 16 is connected to each of the capacitors 26 and 28 so as to regulate the capacitance $C_1$ of the capacitor 26 and the capacitance $C_2$ of the capacitor 28 in a manner to be further described.

A fixed direct current voltage source 30 is provided by a battery connected across the insulated-gate transistor 10 and the load 12. The positive terminal of the voltage source 30 is connected to the source electrode 20 and the negative terminal of the voltage source 30 is connected to ground. The voltage source 30 provides a supply voltage $V_{b1}$ to the insulated-gate transistor 10 and the load 12. A variable direct current voltage source 31 is provided by a battery connected across the variable capacitance network 14. The positive terminal of the voltage source 31 is connected to the capacitor 26 and the negative terminal of the voltage source 31 is connected to ground together with the capacitor 28. The voltage source 31 provides a supply voltage $V_{b2}$ to the variable capacitance network 14. The drain current $I_d$ is the direct current flowing through the insulated-gate transistor 10 from the source electrode 20 through the channel 18 to the drain electrode 22. The drain voltage $V_{ds}$ is the voltage on the drain electrode 22 with respect to the source electrode 20. The gate voltage $V_{gs}$ is the voltage on the gate electrode 24 with respect to the source electrode 20.

The gate voltage $V_{gs}$ is given by the following expression:

$$V_{gs} = V_{b2}\left[\frac{C_1}{C_1+C_2}\right] - V_{b1}$$

Thus, a change in either the capacitance $C_1$ of the capacitor 26 or the capacitance $C_2$ of the capacitor 28 produces a corresponding change in the gate voltage $V_{gs}$. However, in order to achieve optimum sensitivity, it is preferable that the capacitances $C_1$ and $C_2$ vary in an inverse manner; that is, as the capacitance $C_1$ of the capacitor 26 increases the capacitance $C_2$ of the capacitor 28 decreases and vice versa. The above expression for the gate voltage $V_{gs}$ is valid provided the capacitances $C_1$ and $C_2$ are large compared to the capacitance of the gate electrode 24. Since the capacitance of the gate electrode of an insulated-gate transistor is typically a few picofarads, the variable capacitors 26 and 28 could be on the order of 10 to 50 picofarads.

Figure 2:
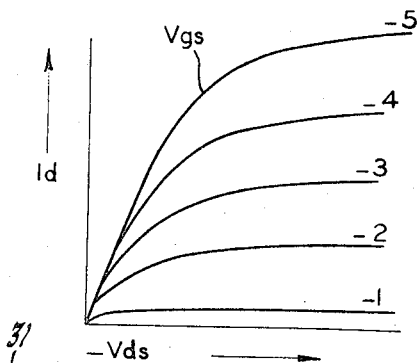
FIG. 2 is a graph of the characteristic curves of a typical insulated-gate transistor having a P-type conductivity channel and operated in the enhancement mode.
Figure 3:
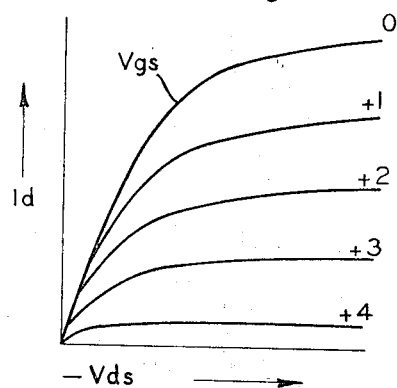
FIG. 3 is a graph of the characteristic curves of a typical insulated-gate transistor having a P-type conductivity channel and operated in the depletion mode.

The insulated-gate transistor 10 may be any of the well known types of insulated-gate field-effect transistors wherein the gate voltage $V_{gs}$ controls the conductance of the channel 18 so as to regulate the drain current $I_d$ flowing from the source electrode 20 through the channel 18 to the drain electrode 22. Thus, the insulated-gate transistor 10 may have a P-type conductivity channel 18 or an N-type conductivity channel 18. However, for demonstration purposes, the insulated-gate transistor 10 is illustrated as having a P-type conductivity channel 18. FIG. 2 illustrates the characteristic curves of a typical insulated gate transistor having a P-type conductivity channel and operated in the enhancement mode. FIG. 3 illustrates the characteristic curves of a typical insulated-gate transistor having a P-type conductivity channel and operated in the depletion mode.

Referring to the characteristic curves of FIG. 2, if the insulated-gate transistor 10 is operated in the enhancement mode, a negative increase in the gate voltage $V_{gs}$ on the gate electrode 24 produces a corresponding increase or "enhancement" of the conductance of the channel 18 thereby increasing the drain current $I_d$ flowing from the source electrode 20 to the drain electrode 22. Referring to the characteristic curves of FIG. 3, if the insulated-gate transistor 10 is operated in the depletion mode, a positive increase in the gate voltage $V_{gs}$ on the gate electrode 24 produces a corresponding decrease in or "depletion" of the conductance of the channel 18 thereby decreasing the drain current $I_d$ flowing from the source electrode 20 to the drain electrode 22. Thus, the drain current $I_d$ flowing through the insulated-gate transistor 10 is regulated by the gate voltage $V_{gs}$ on the gate electrode 24 so that a change in the gate voltage $V_{gs}$ produces a corresponding change in the flow of the drain current $I_d$.

The function of the invention direct current regulator circuit can best be demonstrated by referring to the expression for the gate voltage $V_{gs}$ and the characteristic curves of FIGS. 2 and 3. Assuming the insulated-gate transistor 10 is to be operated in the enhancement mode, the supply voltage $V_{b2}$ of the variable voltage source 31 may be approximately equal to the supply voltage $V_{b1}$ of the fixed voltage source 30. The gate voltage $V_{gs}$ increases negatively as the capacitance $C_1$ decreases and the capacitance $C_2$ increases thereby increasing the drain current $I_d$ flowing through the insulated-gate transistor 10, and the gate voltage $V_{gs}$ decreases negatively as the capacitance $C_1$ increases and the capacitance $C_2$ decreases thereby decreasing the drain current $I_d$ flowing through the insulated-gate transistor 10. Assuming the insulated-gate transistor 10 is to be operated in the depletion mode, the supply voltage $V_{b2}$ of the variable voltage source 31 must be greater than the supply voltage $V_{b1}$ of the fixed voltage source 30. The gate voltage $V_{gs}$ increases positively as the capacitance $C_1$ increases and the capacitance $C_2$ decreases thereby decreasing the drain current $I_d$ flowing through the insulated-gate transistor 10, and the gate voltage $V_{gs}$ decreases positively as the capacitance $C_1$ decreases and the capacitance $C_2$ increases thereby increasing the drain current $I_d$ flowing through the insulated-gate transistor 10. Thus, in operation, the direct drain current $I_d$ flowing through the insulated-gate transistor 10 and through the load 12 is controlled by the gate voltage $V_{gs}$ on the gate electrode 24. The gate voltage $V_{gs}$ is determined according to the previously described relationship of the supply voltage $V_{b2}$ and the capacitances $C_1$ and $C_2$ of the capacitors 26 and 28. The capacitances $C_1$ and $C_2$ of the capacitors 26 and 28 are regulated by the controller 16.

The load 12 may be a current measuring instrument such as an ammeter or a current responsive control device such as a relay. The controller 16 may be any device capable of varying the capacitances $C_1$ and $C_2$ of the capacitors 26 and 28 as by altering the effective distance between the capacitor plates, or the effective area of the capacitor plates, or the dielectric constant of the material between the capacitor plates. Also, as will be readily appreciated, the voltage sources 30 and 31 may be provided by a single voltage source. Where the insulated-gate transistor 10 is operated in the enhancement mode, the required negative gate voltage $V_{gs}$ can be readily obtained by employing a single voltage source. However, where the insulated-gate transistor 10 is operated in the depletion mode, the required positive gate voltage $V_{gs}$ can only be obtained by adding a bias resistor or bias voltage source in series with the source electrode 20 of the insulated-gate transistor 10.

Figure 4:
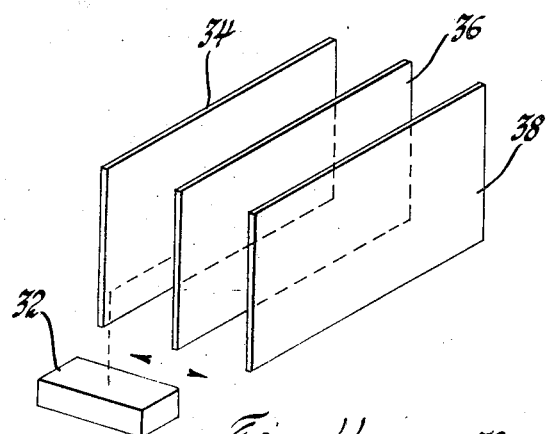
FIG. 4 is a perspective view of a capacitor plate arrangement which may be employed in conjunction with the inventive direct current regular circuit when it is used as a position sensor.
Figure 5:
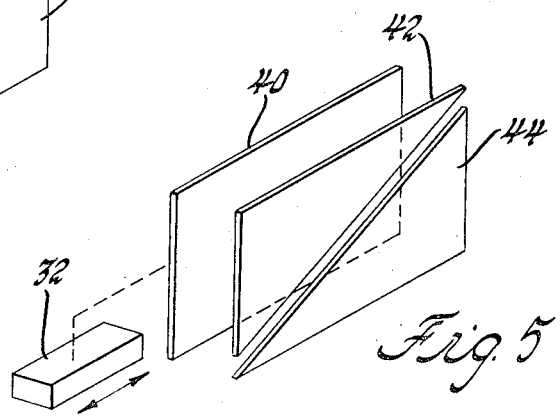
FIG. 5 is a perspective view of another capacitor plate arrangement which may be employed in conjunction with the inventive direct current regulator circuit when it is used as a position sensor.

Although the inventive variable capacitance direct current regulator circuit is adaptable to perform a wide variety of electrical control functions, it is particularly applicable as a position sensor. FIGS. 4 and 5 each disclose a capacitor plate arrangement which may be employed in conjunction with the inventive direct current regulator circuit when it is used as a position sensor. In FIGS. 4 and 5, the controller 16 is provided by a movable member 32 and the variable capacitance network 14 is provided by the respective capacitor plate arrangements which are assembled so as to monitor the relative position of the movable member 32.

In FIG. 4, the capacitor plate arrangement comprising the variable capacitance network 14 includes three rectangular conductive plates 34, 36 and 38 having approximately equal surface areas. The plates 34, 36 and 38 are parallel spaced in face-to-face relationship an equal distance apart. Referring to FIG. 1, the variable capacitor 26 may be formed by the plates 34 and 36 while the variable capacitor 28 may be formed by the plates 36 and 38 so that the plate 36 is common to both of the capacitors 26 and 28. In such instance, the plate 34 is connected to the positive terminal of the variable voltage source 31, the plate 36 is connected to the gate electrode 24, and the plate 38 is connected to ground.

The plate 36 is also connected to the movable member 32 so that as the relative position of the movable member 32 is changed as indicated by the arrow, the plate 36 is similarly moved between the plates 34 and 38 so as to vary the relative distance between the plate 36 and the plates 34 and 38 thereby changing the capacitances $C_1$ and $C_2$ of the capacitors 26 and 28. As the plate 36 is moved, the effective distance between the plate 36 and the plate 34 varies inversely to the effective distance between the plate 36 and the plate 38 so that the capacitance $C_1$ of the capacitor 26 varies inversely to the capacitance $C_2$ of the capacitor 28. Thus, the capacitance $C_1$ increases as the capacitance C decreases and vice versa.

In FIG. 5, the capacitor plate arrangement comprising the variable capacitance network 14 includes three conductive plates 40, 42 and 44. The plate 40 is rectangular while the plates 42 and 44 are triangular. The surface area of the plate 40 is approximately equal to the combined surface area of the plates 42 and 44 which are approximately equal to each other in surface area. The plates 42 and 44 are coplanarly spaced in edge-to-edge relationship so as to form a rectangular configuration having a diagonal opening between the plates 42 and 44. The plate 40 is parallel spaced in face-to-face relationship with the plates 42 and 44. Referring to FIG. 1, the variable capacitor 26 may be formed by the plates 40 and 42 while the variable capacitor 28 may be formed by the plates 40 and 44 so that the plate 40 is common to both of the capacitors 26 and 28. In such instance, the plate 40 is connected to the gate electrode 24, the plate 42 is connected to the positive terminal of the variable voltage source 31, and the plate 44 is connected to ground.

The plate 40 is also connected to the movable member 32 so that as the position of the movable member 32 is changed as indicated by the arrow, the plate 40 is similarly moved across the plates 42 and 44 so as to vary the relative surface area of the plate 40 and the plates 42 and 44 thereby changing the capacitances $C_1$ and $C_2$ of the capacitors 26 and 28. As the plate 40 is moved, the effective area of the plate 40 and the plate 42 varies inversely to the effective area of the plate 40 and the plate 44 so that the capacitance $C_1$ of the capacitor 26 varies inversely to the capacitance $C_2$ of the capacitor 28. Thus, the capacitance $C_1$ increases as the capacitance $C_2$ decreases and vice versa. Referring to FIGS. 1, 4 and 5, as the position of the movable member 32 is changed, the capacitances $C_1$ and $C_2$ are varied, as previously described, so as to alter the gate voltage $V_{gs}$ on the gate electrode 24 thereby changing the flow of direct current $I_d$ through the insulated-gate transistor 10 and the load 12. Thus, the change in the flow of direct current $I_d$ through the insulated-gate transistor 10 and the load 12 corresponds to the charge in the position of the movable member 32.

It will now be apparent that the invention provides a simple and reliable direct current regulator circuit which is particularly applicable as a position sensor within a direct current electrical system. Other applications of the inventive variable capacitance direct current regulator circuit will readily occur to those skilled in the art. However, as will be appreciated, ordinary junction transistors and junction field-effect transistors will not function properly in the inventive circuit since they require direct base current for the operation and direct current cannot be obtained from a variable capacitance network.

It is to be noted that the preferred embodiment of the inventive direct current regulator circuit is disclosed for illustrative purposes only and various alterations and modifications may be made without departing from the spirit and scope of the invention which is to be limited only by the following claims.

What is claimed is:

1. A variable capacitance direct current regulator circuit, comprising: an insulated-gate transistor including source, drain and gate electrodes; voltage control means connected to the gate electrode for regulating the flow of direct current through the insulated-gate transistor from the source electrode to the drain electrode; a load connected in series with the insulated-gate transistor; the voltage control means including a voltage divider network having a pair of series connected capacitors with the gate electrode connected between the capacitors; means for applying a voltage across the insulated-gate transistor and the load and across the voltage divider network; and means for regulating the capacitance of one of the capacitors so as to control the voltage on the gate electrode thereby regulating the flow of direct current through the insulated-gate transistor and through the load.

2. A variable capacitance direct current regulator circuit, comprising: an insulated-gate transistor including source, drain and gate electrodes; voltage control means connected to the gate electrode for regulating the flow of direct current from the source electrode to the drain electrode so that a change in the voltage on the gas electrodes a corresponding change in the flow of direct current through the insulated-gate transistor; a load connected in series with the insulated-gate transistor; the voltage control means including a potentiometer network having a pair of series connected capacitors with the gate electrode connected between the capacitors; means for applying a voltage across the insulated-gate transistor and the load and across the potentiometer network; and means for changing the capacitance of one capacitor inversely to the capacitance of the other capacitor so as to change the voltage on the gate electrode thereby producing a corresponding change in the flow of direct current through the insulated-gate transistor and through the load.

3. A variable capacitance direct current regulator circuit, comprising: an insulated-gate transistor including source, drain and gate electrodes, and a channel connected to the source and the drain electrodes and insulated from the gate electrode; voltage control means connected to the gate electrode for controlling the conductance of the channel so as to regulate the flow of direct current from the source electrode through the channel to the drain electrode so that a change in the voltage on the gate electrode produces a corresponding change in the flow of direct current through the insulated-gate transistor; a load connected in series with the insulated-gate transistor; the voltage control means including a variable capacitance network having a plurality of conductive plates connected so as to form two series coupled capacitors with the gate electrode connected between the capacitors; means for applying a voltage across the insulated-gate transistor and the load and across the variable capacitance network; and means for changing the capacitance of one of the capacitors so as to change the voltage on the gate electrode thereby producing a corresponding change in the flow of direct current through the insulated-gate transistor and through the load.

4. A variable capacitance direct current regulator circuit, comprising: an insulated-gate transistor including source, drain and gate electrodes; voltage control means connected to the gate electrode for regulating the flow of direct current through the insulated-gate transistor from the source electrode to the drain electrode; a load connected in series with the insulated-gate transistor; the voltage control means including a variable capacitance network having three conductive plates connected so as to form two capacitors with a common plate which is connected to the gate electrode; means for applying a voltage across the insulated-gate transistor and the load across the variable capacitance network; and means for regulating the capacitance of one of the capacitors by varying the effective area of the plates forming the capacitors so as to control the voltage on the gate electrode thereby regulating the flow of direct current through the insulated-gate transistor and through the load.

5. A variable capacitance direct current regulator circuit, comprising: an insulated-gate transistor including source, drain and gate electrodes; voltage control means connected to the gate electrode for regulating the flow of direct current through the insulated-gate transistor from the source electrode to the drain electrode; a load connected in series with the insulated-gate transistor; the voltage control means including a variable capacitance network having three conductive plates arranged so as to form two capacitors with a common plate which is connected to the gate electrode; means for applying a voltage across the insulated-gate transistor and the load and across the variable capacitance network; and means for regulating the capacitance of one of the capacitors by varying the effective distance between the plates forming the capacitor so as to control the voltage on the gate electrode thereby regulating the flow of direct current through the insulated-gate transistor and through the load.

6. A variable capacitance position sensor circuit, comprising: an insulated-gate transistor including source, drain and gate electrode; voltage control means connected to the gate electrode for regulating the flow of direct current through the insulated-gate transistor from the source electrode to the drain electrode; a load connected in series with the insulated-gate transistor; the voltage control means including a variable capacitance network having a plurality of conductive plates connected so as to form two series coupled capacitors with the gate electrode connected between the capacitors; means for applying a voltage across the insulated-gate transistor and the load and across the variable capacitance network; and a movable member connected to one of the conductive plates so that as the position of the movable member is changed the plate is moved for changing the capacitance of one capacitor inversely to the capacitance of the other capacitor thereby altering the voltage on the gate electrode so as to produce a change in the flow of direct current through the insulated-gate transistor and through the load corresponding to the change in the position of the movable member.

7. A variable capacitance position sensor circuit, comprising: an insulated-gate transistor including source, drain and gate electrodes, and a channel connected to the source and the drain electrodes and insulated from the gate electrodes; voltage control means connected to the gate electrode for controlling the conductance of the channel so as to regulate the flow of direct current through the insulated-gate transistor from the source electrode through the channel to the drain electrode; a load connected in series with one of the source and drain electrodes; the voltage control means including a variable capacitance network having three conductive plates arranged so as to form two capacitors with a common plate which is connected to the gate electrode; means for applying a voltage across the insulated-gate transistor and the load and across the variable capacitance network; and a movable member connected to the common plate so that as the position of the movable member is changed the common plate is moved for varying the effective distance between the plates forming one capacitor inversely to the effective distance between the plates forming the other capacitor thereby changing the capacitance of one capacitor inversely to the capacitance of the other capacitor so as to alter the voltage on the gate electrode thereby producing a change in the flow of direct current through the insulated-gate transistor and through the load corresponding to the change in the position of the movable member.

8. A variable capacitance position sensor circuit, comprising: an insulated-gate transistor including source, drain and gate electrodes, and a channel connected to the source and the drain electrodes and insulated from the gate electrode; voltage control means connected to the gate electrode for controlling the conductance of the channel so as to regulate the flow of direct current through the insulated-gate transistor from the source electrode through the channel to the drain electrode; a load connected in series with one of the source and drain electrodes; the voltage control means including a variable capacitance network having three conductive plates connected so as to form two capacitors having a common plate which is connected to the gate electrode; means for applying a voltage across the insulated-gate transistor and the load and across the variable capacitance network; and a movable member connected to the common plate so that as the position of the movable member is changed the common plate is moved for varying the effective area of the plates forming one capacitor inversely to the effective area of the plates forming the other capacitor thereby changing the capacitance of one capacitor inversely to the capacitance of the other capacitor so as to alter the voltage on the gate electrode thereby producing a change in the flow of direct current through the insulated-gate transistor and through the load corresponding to the change in the position of the movable member.

References Cited

UNITED STATES PATENTS

| | | | |
|---|---|---|---|
| 3,296,508 | 1/1967 | Hofstein | 317—235 |
| 3,333,168 | 7/1968 | Hofstein | 317—235 |

JAMES D. KALLAM, Primary Examiner

U.S. Cl. X.R.

317—233, 234

PO-1050
(5/69)

UNITED STATES PATENT OFFICE
CERTIFICATE OF CORRECTION

Patent No. 3,546,493          Dated December 8, 1970

Inventor(s) James E. Kauppila

It is certified that error appears in the above-identified patent and that said Letters Patent are hereby corrected as shown below:

Column 1, line 67, "regular" should be -- regulator --. Column 5, line 11, "charge" should be -- change --; line 51, "gas" should be -- gate --; line 52, "trodes" should be -- trode produces --. Column 6, line 24 after "load" insert -- and --; line 74, "trodes" should be -- trode --.

SIGNED AND
SEALED
MAR 9 1971

(SEAL)
Attest:

Edward M. Fletcher, Jr.
Attesting Officer

WILLIAM E. SCHUYLER,
Commissioner of Pate